(12) United States Patent
Tang et al.

(10) Patent No.: US 10,590,309 B2
(45) Date of Patent: Mar. 17, 2020

(54) COPOLYMERS

(71) Applicant: ExxonMobil Chemical Patents Inc.

(72) Inventors: Wei Tang, New York, NY (US); Andy H. Tsou, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 566 days.

(21) Appl. No.: 14/977,775

(22) Filed: Dec. 22, 2015

(65) Prior Publication Data

US 2016/0257841 A1 Sep. 8, 2016

Related U.S. Application Data

(60) Provisional application No. 62/129,260, filed on Mar. 6, 2015.

(51) Int. Cl.

| | | |
|---|---|---|
| *C09D 151/00* | (2006.01) | |
| *C08G 81/00* | (2006.01) | |
| *C08G 81/02* | (2006.01) | |
| *C08F 8/02* | (2006.01) | |
| *C08F 20/06* | (2006.01) | |
| *C08F 20/18* | (2006.01) | |
| *C08F 220/06* | (2006.01) | |
| *C08F 220/18* | (2006.01) | |
| *C09D 187/00* | (2006.01) | |

(52) U.S. Cl.
CPC ....... *C09D 187/005* (2013.01); *C08G 81/021* (2013.01); *C08F 2438/01* (2013.01)

(58) Field of Classification Search
None
See application file for complete search history.

(56) References Cited

U.S. PATENT DOCUMENTS

| | | | | |
|---|---|---|---|---|
| 2011/0015338 A1* | 1/2011 | Fujimura | ............... | C08F 110/06 524/547 |
| 2011/0104503 A1* | 5/2011 | Machida | ................... | C08F 2/18 428/430 |
| 2014/0088262 A1* | 3/2014 | Crowther | .................. | C08F 8/00 525/333.7 |

FOREIGN PATENT DOCUMENTS

| | | |
|---|---|---|
| EP | 1 211 269 | 6/2002 |
| EP | 2 479 231 | 7/2012 |
| WO | 2014/047423 | 3/2014 |
| WO | 2015/023381 | 2/2015 |

\* cited by examiner

*Primary Examiner* — Michael J Feely

(57) ABSTRACT

A polyacrylate-polyolefin copolymer and composition for volatile solvent-free coating comprising such compounds having the following structure:

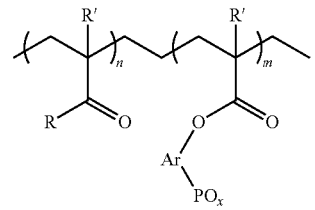

wherein "PO" is a polyolefin having a number average molecular weight of at least 300 g/mole, and "Ar" is selected from the group consisting of C6 to C20 aryls, a C7 to C32 alkylaryls, a C6 to C20 aryloxys, and halogen substituted C6 to C20 aryls and C7 to C32 alkylaryls, while the other variables are as described herein. The copolymers can be produced in an alkylation reaction between the desired polyacrylate and a vinyl/vinylidene-terminated polyolefin.

19 Claims, No Drawings

COPOLYMERS

CROSS REFERENCE TO RELATED APPLICATIONS

This invention claims priority to and the benefit of U.S. Ser. No. 62/129,260, filed Mar. 6, 2015.

FIELD OF THE INVENTION

Disclosed herein are copolymers and compositions useful for volatile solvent-free coatings.

BACKGROUND OF THE INVENTION

It is desirable to incorporate hydrophobic polyolefin components into acrylic polymers and acrylic networks to enhance the hydrophobicity of the acrylics, to lower their water uptake, to improve the crosslink stability of acrylic coatings and particles, to impact mechanical toughness, and to raise surface hydrophobicity. One approach to achieve these ends is to use C18-C22 fatty acid derivatives as di-acid chain extenders. However, the hydrophobicity of acrylics can only be raised slightly in this manner due to the short alkyl length while the crosslink density is reduced. Another method is to incorporate polyolefin latex into the acrylic coating formulation. However, those polyolefin latexes have been prepared by grinding polyolefin pellets into fine powders followed by dispersion in water with the aid of high concentrations of surfactant. These polyolefin latexes do not blend or mix well with polyacrylics or polymethacrylics (as used herein, "polyacrylics") and the surfactants made using these formulations could affect the coating coalescence and film formation.

Incorporation of olefin monomers or polymer into the backbone of polyacrylates is difficult. Polyacrylics and polymethacrylics are made by convention emulsion (aqueous) radical polymerization. Olefin monomers or polymers cannot be easily dispersed or emulsified in water and thus cannot be included during the emulsion polymerization of acrylates or methacrylates. Another method to synthesize polyacrylics or polymethacrylics is by controlled radical polymerization. However, due to the radical lifetime of olefinic radicals, control radical polymerization cannot polymerize or copolymerize linear alpha-olefins. Typically, controlled radical polymerization can only random-copolymerize or block-copolymerize styrenics, acrylics, and methacrylics. Thus, what is needed is an improved method of incorporating some level of hydrophobicity in polyacrylics and polyacrylic formulations.

Related publications include WO 2014/047423; EP 1 211 269 A1; and EP 2 479 231.

SUMMARY OF THE INVENTION

Disclosed herein is a copolymer comprising (or consisting essentially of, or consisting of) compounds having the following structure:

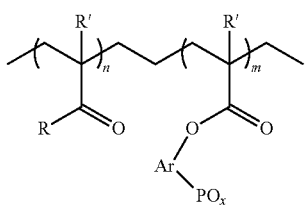

wherein: each PO is independently a polyolefin having a number average molecular weight of at least 300 g/mole; n and m are each an integer independently within a range from 1 to 2000; x is an integer from 1 to 3, or 4; each R is independently selected from the group consisting of —O—Ar, —O—R", an amine, and an alkyl amine; each Ar is independently selected from the group consisting of a C6 to C20 aryl, a C7 to C32 alkylaryl, a halogen substituted C6 to C20 aryl and a halogen substituted C7 to C32 alkylaryl; each R" is independently selected from the group consisting of hydrogen, a C1 to C10 alkyl, and a glycidyl; and each R' is independently selected from the group consisting of hydrogen and a C1 to C10 alkyl.

Also disclosed is a method of forming a copolymer comprising (or consisting essentially of) combining two or more polymerizable monomers having the following structures:

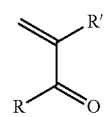

wherein: each R is independently selected from the group consisting of —O—Ar, —O—R", an amine, and an alkyl amine, with the proviso that at least one polymerizable monomer comprises —O—Ar as R; each Ar is independently selected from the group consisting of a C6 to C20 aryl, a C7 to C32 alkylaryl, a halogen substituted C6 to C20 aryl and a halogen substituted C7 to C32 alkylaryl; each R" is independently selected from the group consisting of hydrogen, a C1 to C10 alkyl, and a glycidyl; each R' is independently selected from the group consisting of hydrogen and a C1 to C10 alkyl, thus forming a polymer backbone; and combining the polymer backbone with a vinyl-terminated polyolefin or a vinylidene-terminated polyolefin, each having a number average molecular weight of at least 300 g/mole, under alkylation conditions to form the copolymer.

DETAILED DESCRIPTION OF THE INVENTION

The inventors have found a way to incorporate hydrophobic polyolefin chains in a polyacrylate or polymer backbone to make compositions suitable for such end uses as solvent-free coatings. This is accomplished by incorporating a co-monomer of an aryl acrylate, such as benzyl acrylate, in the polyacrylate or polymer backbone. Having the aryl groups as part of the polyacrylate or polymer backbone, one can alkylate this pendant aromatic ring using vinyl or vinylidene terminated polyolefins through, for example, Friedel-Crafts alkylation. This will lead to the formation of polyolefin-grafted-polyacrylate (polyacrylate-polyolefin) copolymers. Comb structures instead of linear di-, tri-, or multiblock structures can provide enhanced processability due to the presence of long-chain comb branches. These copolymers could be useful in latex composition for coatings, especially those that are water-based and substantially free of volatile solvents.

Thus, the invention includes a copolymer comprising (or consisting essentially of, or consisting of) compounds having the following structure (1):

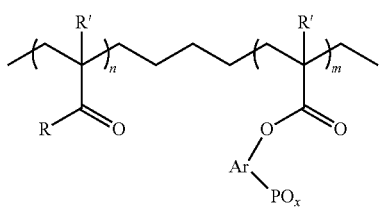

(1)

wherein "PO" is a polyolefin bound to the "Ar" and having a number average molecular weight of at least 300 g/mole; each R is independently selected from the group consisting of —O—Ar, —O—R", amine and alkyl amine; each Ar is independently selected from the group consisting of C6 to C10 or to C20 aryl, C7 to C11 or to C32 alkylaryl, halogen substituted C6 to C10 or to C20 aryl and halogen substituted C7 to C11 or to C32 alkylaryl; each R" is independently selected from the group consisting of hydrogen, C1 to C10 alkyl and glycidyl; and each R' is independently selected from the group consisting of hydrogen and C1 to C10 alkyls. The other variables are as follows:

n and m are each an integer independently within a range from 1 to 20, or to 100, or to 500, or to 1000, or to 2000; and x is an integer from 1 to 3 or to 4.

In any embodiment, the copolymer preferably comprises compounds having the following structure:

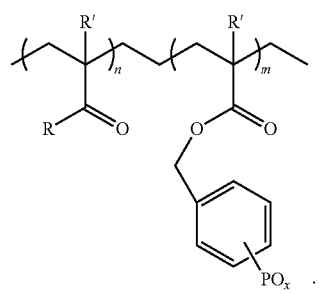

(2)

It can be seen that the copolymer may be in the form of a comb structure wherein a number of pendant groups form a highly branched structure ("m" is larger than 10, or 20, or 30, or 40, or 50). In any embodiment of the polyacrylate-polyolefin copolymer each R is a hydroxyl or methyloxyl, or a combination thereof, and R' is a hydrogen or methyl, or combinations thereof.

The polyolefin or "PO" portion of the copolymer derives from a vinyl/vinylidene-terminated polyolefin that is reacted through an alkylation reaction with the polyacrylic copolymer, preferably through an aryl group pendant to the polyacrylic copolymer. The "PO" portion of the inventive copolymer is of course a fragment of a polyolefin, but described herein as a "polyolefin" or "PO" and is preferably selected from the group consisting of ethylene homopolymer, copolymer of ethylene with one or more linear alpha olefins, propylene homopolymer, copolymer of propylene with one or more linear alpha olefins, isobutylene homopolymer, isobutylene copolymer with one or more conjugated dienes, and combinations thereof. Most preferably, the PO is an isotactic or atactic polypropylene having a number average molecular weight within the range from 300 g/mole to 100,000 g/mole. The vinyl/vinylidene-terminated polyolefins will be described further below.

The copolymers described herein have certain desirable features that can be measured quantitatively. For instance, in any embodiment the inventive copolymers having a branching, $g'_{vis\ avg}$ (MALLS/3D) of less than 0.90, or 0.80, or 0.70, or 0.60, or 0.50. Further, the copolymers a weight average molecular weight (Mw) (MALLS/3D) within a range from 20,000, or 50,000, or 90,000, or 100,000 g/mole to 150,000, or 175,000, or 200,000, or 500,000, or 1,000,000, or 2,000,000, or 3,000,000 g/mole. Further, the inventive copolymers have a MWD (weight average molecular weight/number average molecular weight) within the range from 1.1, or 1.3, or 1.5 to 8, or 9, or 10. The MWD may largely be determined by the method in which the polyacrylate copolymer backbone is formed. It may be formed by any known method such as by free radical polymerization, or atom transfer radical polymerization.

As mentioned, the copolymers may be useful alone or in combination with other ingredients in a coating composition, most preferably a water-based coating. Preferably, the coatings are substantially free of volatile solvents, meaning that if volatile solvents are present at all, they are present to less than 3, or 2, or 1 wt % by weight of the entire composition. "Volatile solvents" include such solvents as hexanes, toluene, xylenes, acetone, ketones, and other solvents well known in the art.

As mentioned, the polyacrylate portion of the copolymer may be formed by any appropriate method such as by free radical polymerization, or atom transfer radical polymerization. In any embodiment, the invention disclosed herein also includes a method of forming a copolymer comprising (or consisting essentially of) combining two or more acrylates selected from the group consisting of those having the following structures (3):

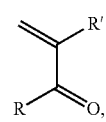

(3)

wherein each R is independently selected from the group consisting of —O—Ar, —O—R", amine, and alkylamine, with the proviso that at least one polymerizable monomer comprises —O—Ar as R; each Ar is independently selected from the group consisting of C6 to C10, or to C20 aryl, C7 to C11, or to C32 alkylaryl, halogen substituted C6 to C10, or to C20 aryls, and halogen substituted C7 to C11, or to C32 alkylaryl; each R" is independently selected from the group consisting of hydrogen, C1 to C10 alkyl, and glycidyl; each R' is independently selected from hydrogen and C1 to C10 alkyl, thus forming a polymer backbone. In any embodiment, for the polymer in structure (1) or (2) above should comprise at least 10, or 20, or 50, or 100, or 200, and up to 1000, or 2000 "mer" or monomer (3) units, where, preferably, within a range from 0.1, or 0.5, or 1, or 5 wt % to 10, or 20, or 40, or 50 wt % of the units comprise aryl groups as show in (2) above.

Following formation of the backbone polyacrylate, in any embodiment the inventive process further includes combining the polyacrylate with a vinyl/vinylidene-terminated polyolefin having a number average molecular weight of at least 300 g/mole alkylation conditions to form the copolymer. Any method of alkylation may be used, but one desirable method is a Friedel Crafts-type alkylation process, which includes combining the vinyl/vinylidene-terminated polyolefin with the polyacrylate having at least one aryl pendant group under such conditions, preferably at elevated temperature and with a Lewis acid catalyst. Preferably, the combining (alkylation) of the polyacrylate with the vinyl or vinylidene terminated polyolefins takes place in an solvent at a temperature within the range from 40, or 50, or 90, or 100° C. to 130, or 140, or 150, or 160, or 170, or 200° C. Also preferably the solvent is selected from the group consisting of benzene, toluene, xylene, C5 to C20 alkanes, or combinations thereof. The thus formed copolymer may be purified by separating the solvent, at least, and further by separating any unreacted components and forming a coating composition by addition of (comprising combining) the copolymer to (with) an aqueous composition, wherein volatile compounds are substantially absent.

The vinyl/vinylidene-terminated polyolefins ("VTP") useful in the inventive copolymers described herein can be made in any number of ways. By "vinyl/vinylidene", what is meant is that the polyolefin may be a mixture of both vinyl- and vinylidene-terminated polyolefins, or the polyolefin may be substantially all one form or the other. Preferably, the VTP's useful herein are polymers as first described in US 2009/0318644 having at least one terminus (CH2=CHCH$_2$-oligomer or polymer) represented by formula (4):

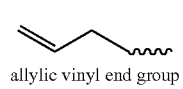

(4)

allylic vinyl end group where the " 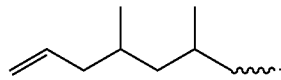 " here represents the "PO" portion of the inventive functionalized polyolefins. In a preferred embodiment the allyl chain ends are represented by the formula (5):

(5)

The amount of allyl chain ends is determined using $^1$H NMR at 120° C. using deuterated tetrachloroethane as the solvent on a 500 MHz machine, and in selected cases confirmed by $^{13}$C NMR. In any case, Resconi has reported proton and carbon assignments (neat perdeuterated tetrachloroethane used for proton spectra while a 50:50 mixture of normal and perdeuterated tetrachloroethane was used for carbon spectra; all spectra were recorded at 100° C. on a Bruker AM 300 spectrometer operating at 300 MHz for proton and 75.43 MHz for carbon) for vinyl-terminated propylene polymers in Resconi et al, 114, J. AM. CHEM. SOC., pp. 1025-1032 (1992) that are useful herein.

The vinyl/vinylidene-terminated propylene-based polymers may also contain an isobutyl chain end. "Isobutyl chain end" is defined to be an oligomer having at least one terminus represented by the formula (6):

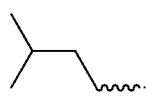

(6)

In a preferred embodiment, the isobutyl chain end is represented by one of the following formulae (7):

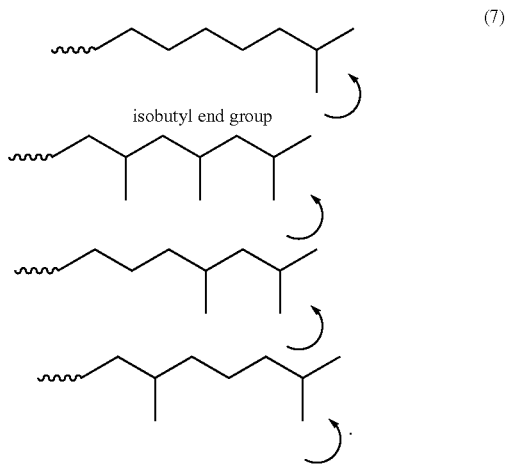

(7)

isobutyl end group

The percentage of isobutyl end groups is determined using $^{13}$C NMR (as described in the example section) and the chemical shift assignments in Resconi for 100% propylene oligomers. Preferably, the vinyl/vinylidene-terminated polymers described herein have an allylic terminus, and at the opposite end of the polymer an isobutyl terminus.

The VTPs can be made by any suitable means, but most preferably the VTPs are made using conventional slurry or solution polymerization processes using a combination of bridged metallocene catalyst compounds (especially bridged bis-indenyl or bridged 4-substituted bis-indenyl metallocenes) with a high-molecular volume (at least a total volume of 1000 Å$^3$) perfluorinated boron activator, for example, as described in US 2012/0245299.

The vinyl/vinylidene-terminated polyolefin can be any polyolefin having a vinyl/vinylidene-terminal group, and is preferably selected from the group consisting of vinyl/vinylidene-terminated isotactic polypropylenes, atactic polypropylenes, syndiotactic polypropylenes, propylene-butene copolymers, propylene-hexene copolymers, and propylene-ethylene copolymers (wherein the copolymers may be random, elastomeric, impact and/or block), and combinations thereof, each having a number-average molecular weight (Mn) of at least 3000 g/mole. In any embodiments, the VTP may be a copolymer or terpolymer wherein the C2 content (ethylene derived units) of the vinyl/vinylidene-terminated polyolefin is from 3 to 50 wt %, the C3 content (propylene derived units) is from 50 to 97 wt %; in yet another embodiment, the VTP may contain a third comonomer, thus, the C4 through C14 content (units derived from C4 to C14 α-olefins or dienes) is from 5 to 30 wt % in those embodiments, while the C2 content is from 5 to 50 wt % and the C3 content is from 20 to 90 wt %. Most preferably, the VTP is a polyethylene, especially a high density polyethylene, wherein the high density polyethylene preferably has a density of at least 0.940, or 0.945, or 0.950 g/cm$^3$.

In any embodiment, greater than 70, or 80, or 90, or 94, or 96% of the VTP comprises terminal vinyl groups; or within the range of from 50, or 60 wt % to 70, or 80, or 90, or 95, or 98 or 99%. As described above, the vinyl/vinylidene-terminated polyolefins preferably have a number average molecular weight (Mn) value of at least 300, or 400, or 500, or 1000 g/mole, or within the range of from 300, or 400, or 500, or 1,000, or 10,000, or 20,000 g/mole to 20,000, or 30,000, or 40,000, 50,000, or 100,000 g/mole. The vinyl/vinylidene-terminated polyolefins preferably have a weight-average molecular weight (Mw) value within the range from 3,000, or 4,000, or 5,000, or 10,000 g/mole to 25,000, or 30,000, or 40,000, or 50,000, or 100,000, or 200,000, or 250,000 g/mole. The VTPs most useful herein have a molecular weight distribution (Mw/Mn) of less than 3.0 or 4.0 or 5.0, or within a range of from 1.8, or 2.0 to 3.0, or 4.0, or 4.5, or 5.0. Preferably, the VTP useful herein is amorphous polypropylene, and desirably has a glass transition temperature (Tg) of less than 10 or 5 or 0° C., more preferably less than −10° C.; or within the range of from 0, or −5, or −10° C. to −30, or −40, or −50° C. or as described herein.

The VTPs are preferably linear, meaning that there is no polymeric or oligomeric branching from the polymer backbone, or described quantitatively, having a branching index "g" (or $g'_{(vis\ avg)}$) an of at least 0.90 or 0.96 or 0.97 or 0.98, wherein the "branching index" is well known in the art and measurable by published means, and the value of such branching index referred to herein is within 10 or 20% of the value as measured by any common method of measuring the branching index for polyolefins as is known in the art such as in US 2013/0090433.

A particularly preferred VTP is one wherein the vinyl terminated polyolefin is a compound or mixture of compounds represented by the formula (8):

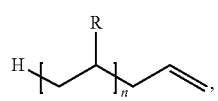

(8)

wherein each "R" is selected from hydrogen and C1 to C4 or C10 alkyls, preferably hydrogen or methyl, or a mixture thereof; and n is an integer from 20, or 40 to 100, or 200, or 500, or 800, or 1000, or 1500, or 2000. It is these VTPs that are reacted, under suitable conditions, with an alkylating agent to form the polyacrylate-polyolefins structures shown in (1) or (2) above.

The various descriptive elements and numerical ranges disclosed herein for the inventive copolymers and methods of forming such can be combined with other descriptive elements and numerical ranges to describe the invention(s); further, for a given element, any upper numerical limit can be combined with any lower numerical limit described herein, including the examples. The features of the inventions are demonstrated in the following non-limiting examples.

EXAMPLES

Test Methods

Branching

The inventive copolymers herein are highly branched and thus quantifying the branching must take into account some factors. The calculated $g'_{vis\ avg}$ values herein were not corrected for the acrylate coil dimensional changes, and were based on polyolefin coil dimension references, hence, this g' number can vary greatly depending on the reference used. The values herein are an estimate (±30%). The g' values can be determined as described in US 2013/0090433.

Molecular Weights

Polymer molecular weight (weight-average molecular weight, Mw, number-average molecular weight, Mn, and z-averaged molecular weight, Mz) and molecular weight distribution (Mw/Mn) are determined using Size-Exclusion Chromatography. Equipment consists of a High Temperature Size Exclusion Chromatograph (either from Waters Corporation or Polymer Laboratories), with a differential refractive index detector (DRI), an online light scattering detector, and a viscometer (SEC-DRI-LS-VIS), and also a Multi-Angle Light Scattering detector (MALLS), and monodispersed polystyrene is the standard. For purposes of the claims, SEC-DRI-LS-VIS shall be used. Three Polymer Laboratories PLgel 10 mm Mixed-B columns are used. The nominal flow rate is 0.5 cm³/min and the nominal injection volume is 300 μL. The various transfer lines, columns and differential refractometer (the DRI detector) are contained in an oven maintained at 135° C. Solvent for the SEC experiment is prepared by dissolving 6 grams of butylated hydroxy toluene as an antioxidant in 4 liters of reagent grade 1,2,4-trichlorobenzene (TCB). The TCB mixture is then filtered through a 0.7 μm glass pre-filter and subsequently through a 0.1 μm Teflon filter. The TCB is then degassed with an online degasser before entering the SEC. MALLS analysis is relied upon for Mw and Mz when calculating, for example, Mw/Mn, or Mz/Mn, which is a better method for measuring highly branched polymers, while DRI values are used for Mn, which is more sensitive and detects smaller molecules.

Example 1. Synthesis of p(MMA-r-BzMA)-b-iPP Copolymer

To a round bottom flask, was loaded methyl methacrylate (20 g), benzyl methacrylate (2 g), Copper(I) chloride (0.1 g), Copper(0) (0.05 g) and ethyl bromoisobutyryl bromide ("EBB") (0.15 ml). The reaction mixture was purged with N₂ for 10 minutes, then the 1,1,4,7,7-pentamethyldiethylenetriamine ("PMDTA") (0.3 ml, purged with N₂) was added to the reaction mixture. The reaction was heated to 80° C. for 15 min. The reaction was stopped, cooled down and diluted with 20 g acetone, and then the mixture was passed through an alumina column to remove the catalyst. The solution was precipitated into 100 g of methanol. A white powder of random copolymer of p(MMA-r-BzMA) was obtained and dried in a vacuum oven.

The obtained polymer (5 g) was added to a round bottom flask, along with 0.3 g vinyl/vinylidene-terminated isotactic polypropylene (VTiPP) (Mn is 23,000 g/mole), 10 mg methane sulfonic acid and 20 g xylene. The mixture was purged with N₂ and heated to 120° C. for 2 hours. The reaction mixture was precipitated into methanol and the obtained white powder of poly(MMA-r-BzMA)-b-iPP or polymethacrylate and polyolefin copolymer was dried in a vacuum oven. The reaction scheme is shown in FIG. 1. Atom transfer radical polymerization was carried out for the synthesis of the backbone polymer of polymethacrylates (p(MMA-r-BzMA)). The VTiPP was then grafted onto the phenyl or benzyl groups in the backbone polymer through Friedel-Crafts alkylation using a Lewis-acid catalyst (methane sulfonic acid, in this example). Scheme (1) depicts this reaction, where the iPP can be in para or ortho position:

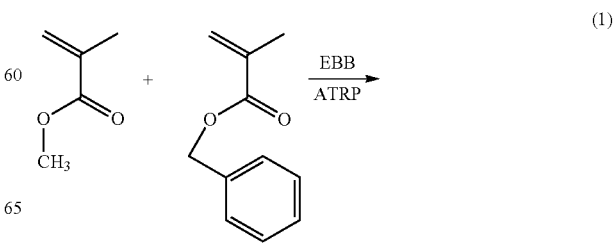

(1)

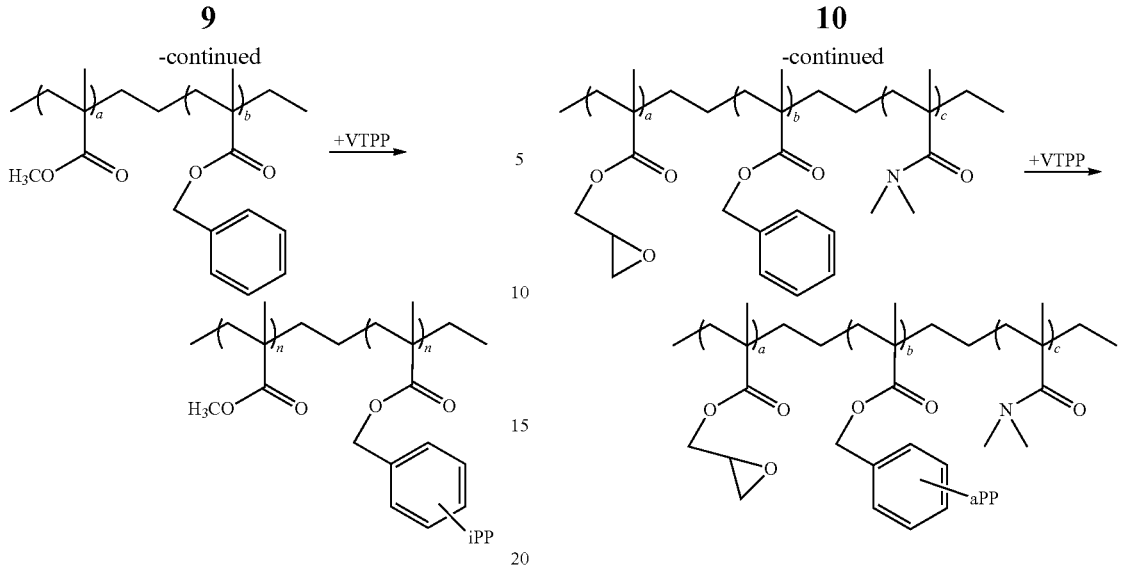

The resulting p(MMA-r-BzMA) was completely soluble in acetone, however the prepared p(MMA-r-BzMA)-b-iPP can only be dispersed in acetone to form a milky dispersion. This indicates that vinyl/vinylidene-terminated iPP ("VTiPP") was incorporated into the copolymer, as VTiPP is not soluble in acetone. On the other hand, p(MMA-r-BzMA) can be dissolved in toluene, but VTiPP is not soluble in toluene at room temperature. However, the copolymer p(MMA-r-BzMA)-b-iPP can be easily dissolved in toluene.

Example 2. Synthesis of p(DMAA-GMA-BzMA)b-aPP Copolymer

To a round bottom flask, was loaded methyl dimethylacrylamide (20 g), glycidyl methacrylate (2 g), benzyl methacrylate (2 g) and 0.2 g 2,2'-azobis(2-methylpropionitrile) ("AIBN"). The reaction mixture was purged with $N_2$ for 10 minutes, and then heated to 90° C. for 30 min. The reaction was stopped, cooled down and diluted with 100 g acetone, and then it was precipitated into 400 g hexane. A white powder of random copolymer of p(DMAA-GMA-BzMA) was obtained and dried in a vacuum oven.

The obtained polymer (5 g) was added to a round bottom flask, along with 0.6 g vinyl/vinylidene-terminated atactic polypropylene (Mn is 1,000 g/mole), 60 mg methane sulfonic acid and 30 g xylene. The mixture was purged with $N_2$ and heated to 120° C. for 2 hours. The reaction mixture was precipitated into methanol and the obtained white powder of a copolymer was dried a vacuum oven. The scheme (2) below shows that three monomers were copolymerized via a free radical polymerization to give a water soluble polymer, which is then ortho or para grafted with aPP through Friedel-Crafts alkylation using a Lewis-acid catalyst:

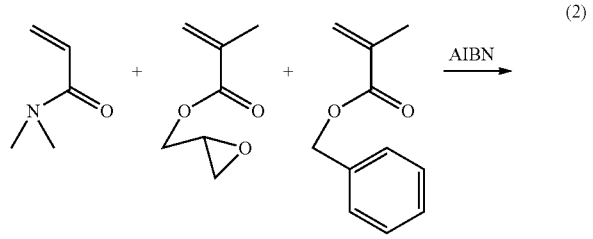

(2)

The GPC traces of the final copolymer product yield a p(DMAA-GMA-BzMA)-b-aPP copolymer having a Mn of 45,500 g/mole, a Mw of 78,000 g/mole, and a Mz of 123,400 g/mole, and a $g'_{vis\ avg}$ of about 0.3 (long chain branch index based on viscometric radius ratio). The copolymer can be dispersed in water to form a stable dispersion. The copolymer can be further cured with addition of polyamines (such as tetraethylenepentaamine) to form a crosslinked methacrylic film.

Having described the various features of the inventive copolymers and the methods of forming them, disclosed here in numbered paragraphs is:

P1. A copolymer comprising compounds having the following structure:

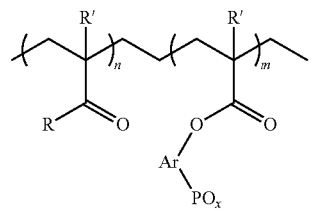

wherein:
each PO is independently a polyolefin having a number average molecular weight of at least 300 g/mole;
n and m are each an integer independently within a range from 1 to 2000;
x is an integer from 1 to 4;
each R is independently selected from the group consisting of –O—Ar, —O—R", an amine, and an alkyl amine;
each Ar is independently selected from the group consisting of a C6 to C20 aryl, a C7 to C32 alkylaryl, a halogen substituted C6 to C20 aryl and a halogen substituted C7 to C32 alkylaryl;
each R" is independently selected from the group consisting of hydrogen, a C1 to C10 alkyl, and a glycidyl; and
each R' is independently selected from the group consisting of a hydrogen and a C1 to C10 alkyl.

P2. The polyacrylate-polyolefin copolymer of numbered paragraph 1, comprising compounds having the following structure, wherein "Ar" is a benzyl ($C_7H_7$—) group:

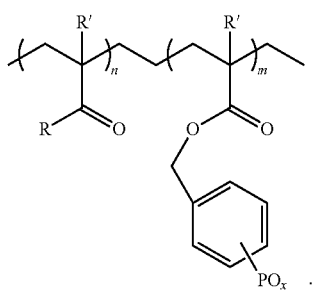

P3. The polyacrylate-polyolefin copolymer of numbered paragraph 2, wherein R is a hydroxy or methyloxy, or a combination thereof, and R' is a hydrogen or methyl, or combinations thereof.

P4. The polyacrylate-polyolefin copolymer of any one of the previous numbered paragraphs, wherein PO is selected from the group consisting of ethylene homopolymer, copolymer of ethylene with one or more linear alpha olefins, propylene homopolymer, copolymer of propylene with one or more linear alpha olefins, isobutylene homopolymer, isobutylene copolymer with one or more conjugated dienes, and combinations thereof.

P5. The polyacrylate-polyolefin copolymer of any one of the previous numbered paragraphs, wherein PO is an isotactic or atactic polypropylene having a number average molecular weight within the range from 300 g/mole to 100,000 g/mole.

P6. The polyacrylate-polyolefin copolymer of any one of the previous numbered paragraphs, having a branching, $g'_{vis\ avg}$ (MALLS/3D) of less than 0.90, or 0.80, or 0.70, or 0.60, or 0.50.

P7. The polyacrylate-polyolefin copolymer of any one of the previous numbered paragraphs, having a weight average molecular weight (MALLS/3D) within a range from 50,000, or 90,000, or 100,000 g/mole to 150,000, or 175,000, or 200,000, or 500,000, or 1,000,000, or 2,000,000, or 3,000,000 g/mole.

P8. The polyacrylate-polyolefin copolymer of any one of the previous numbered paragraphs, having a MWD (weight average molecular weight/number average molecular weight) within the range from 1.1, or 1.3, or 1.5 to 8, or 9, or 10.

P9. The polyacrylate-polyolefin copolymer of any one of the previous numbered paragraphs, wherein the copolymer comprises a comb structure.

P10. A coating composition comprising the polyacrylate-polyolefin copolymer of any one of the previous numbered paragraphs.

P11. The coating composition of numbered paragraph 10, wherein volatile organic compounds are substantially absent.

P12. A method of forming a copolymer comprising:
combining two or more polymerizable monomers having the following structure:

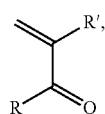

wherein:
each R is independently selected from the group consisting of —O—Ar, —O—R", an amine, and an alkyl amine, with the proviso that at least one polymerizable monomer comprises —O—Ar as R;
each Ar is independently selected from the group consisting of a C6 to C20 aryl, a C7 to C32 alkylaryl, a halogen substituted C6 to C20 aryl and a halogen substituted C7 to C32 alkylaryl;
each R" is independently selected from the group consisting of hydrogen, a C1 to C10 alkyl, and a glycidyl;
each R' is independently selected from the group consisting of hydrogen and a C1 to C10 alkyl, thus forming a polymer backbone; and
combining the polymer backbone with a vinyl-terminated polyolefin or a vinylidene-terminated polyolefin, each having a number average molecular weight of at least 300 g/mole, under alkylation conditions to form the copolymer.

By the phrase "consisting essentially of" what is meant is that the claimed compound or composition does not include any components that influence its overall usefulness and/or properties; alternatively, it the phrase means that any other components are present to a level of less than 3, or 2, or 1 wt % by weight of the composition or compound being claimed. With reference to a method or process, the phrase means that no other step is involved that alters/adds/removes any chemical bonds in the copolymer.

Also disclosed herein is the use of a copolymer as described in a coating composition that is substantially free of volatile solvents.

Also disclosed is the use of a vinyl/vinylidene-terminated polyolefin in the production of a copolymer as described herein.

For all jurisdictions in which the doctrine of "incorporation by reference" applies, all of the test methods, patent publications, patents and reference articles are hereby incorporated by reference either in their entirety or for the relevant portion for which they are referenced.

The invention claimed is:
1. A copolymer comprising compounds having the following structure:

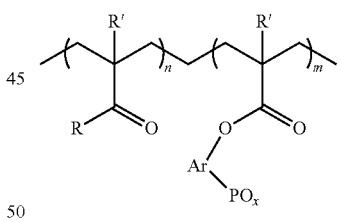

wherein:
each PO is independently a polyolefin having a number average molecular weight of at least 300 g/mole;
n and m are each an integer independently within a range from 1 to 2000;
x is an integer from 1 to 4;
each R is independently selected from the group consisting of —O—Ar, —O—R", an amine, and an alkyl amine;
each Ar is independently selected from the group consisting of a C6 to C20 aryl, a C7 to C32 alkylaryl, a halogen substituted C6 to C20 aryl and a halogen substituted C7 to C32 alkylaryl;
each R" is independently selected from the group consisting of hydrogen, a C1 to C10 alkyl, and a glycidyl; and each R' is independently selected from the group consisting of a hydrogen and a C1 to C10 alkyl.

2. The copolymer of claim 1, comprising compounds having the following structure:

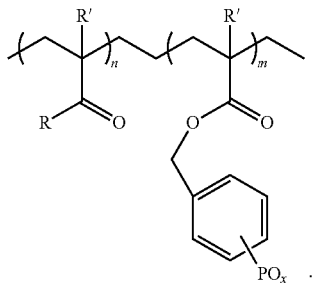

wherein: PO, n, m, x, R, and R' are defined as set forth in claim 1.

3. The copolymer of claim 2, wherein R is —O—R", each R" is independently hydrogen or methyl, and each R' is independently hydrogen or methyl.

4. The copolymer of claim 1, wherein each PO is independently selected from the group consisting of ethylene homopolymer, copolymer of ethylene with one or more linear alpha olefins, propylene homopolymer, copolymer of propylene with one or more linear alpha olefins, isobutylene homopolymer, isobutylene copolymer with one or more conjugated dienes, and combinations thereof.

5. The copolymer of claim 1, wherein each PO is independently an isotactic or atactic polypropylene having a number average molecular weight within a range from 300 g/mole to 100,000 g/mole.

6. The copolymer of claim 1, having a branching, $g'_{vis\ avg}$ (MALLS/3D) of less than 0.90.

7. The copolymer of claim 1, having a weight average molecular weight (MALLS/3D) within a range from 50,000 g/mole to 3,000,000 g/mole.

8. The copolymer of claim 1, having a MWD (weight average molecular weight/number average molecular weight) within a range from 1.1 to 10.

9. The copolymer of claim 1, wherein the copolymer comprises a comb structure.

10. A coating composition comprising the copolymer of claim 1.

11. The coating composition of claim 10, wherein volatile organic compounds are substantially absent.

12. A method of forming a copolymer comprising:
combining two or more polymerizable monomers having the following structure:

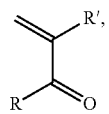

wherein:
each R is independently selected from the group consisting of —O—Ar, —O—R", an amine, and an alkyl amine, with the proviso that at least one polymerizable monomer comprises —O—Ar as R;

each Ar is independently selected from the group consisting of a C6 to C20 aryl, a C7 to C32 alkylaryl, a halogen substituted C6 to C20 aryl and a halogen substituted C7 to C32 alkylaryl;
each R" is independently selected from the group consisting of hydrogen, a C1 to C10 alkyl, and a glycidyl;
each R' is independently selected from the group consisting of hydrogen and a C1 to C10 alkyl, thus forming a polymer backbone; and
combining the polymer backbone with a vinyl-terminated polyolefin or a vinylidene-terminated polyolefin, each having a number average molecular weight of at least 300 g/mole, under alkylation conditions to form the copolymer.

13. The method of claim 12, wherein the copolymer comprises the following structures:

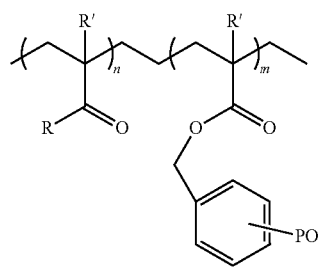

wherein each PO is independently the polyolefin having a number average molecular weight of at least 300 g/mole, n and m are each an integer independently within a range from 1 to 2000, and R and R' are defined as set forth in claim 12.

14. The method of claim 13, wherein each PO is independently selected from the group consisting of ethylene homopolymer, copolymer of ethylene with one or more linear alpha olefins, propylene homopolymer, copolymer of propylene with one or more linear alpha olefins, isobutylene homopolymer, isobutylene copolymer with one or more conjugated dienes, and combinations thereof.

15. The method of claim 12, wherein the combining (alkylation) of the polymer backbone with the vinyl-terminated polyolefin or vinylidene terminated polyolefin takes place in an solvent at a temperature within a range from 40° C. to 200° C.

16. The method of claim 15, wherein the solvent is selected from the group consisting of benzene, toluene, xylene, C5 to C20 alkanes, and combinations thereof.

17. The method of claim 12, wherein the step of combining two or more polymerizable monomers is performed under free radical polymerization conditions or atom transfer radical polymerization conditions.

18. The method of claim 12, wherein a Lewis acid catalyst is present in the alkylation step of combining (alkylation) the polymer backbone with the vinyl-terminated polyolefin or the vinylidene-terminated polyolefin.

19. A method of forming a coating composition comprising combining the copolymer formed in claim 12 with an aqueous composition, wherein volatile compounds are substantially absent.

* * * * *